UNITED STATES PATENT OFFICE.

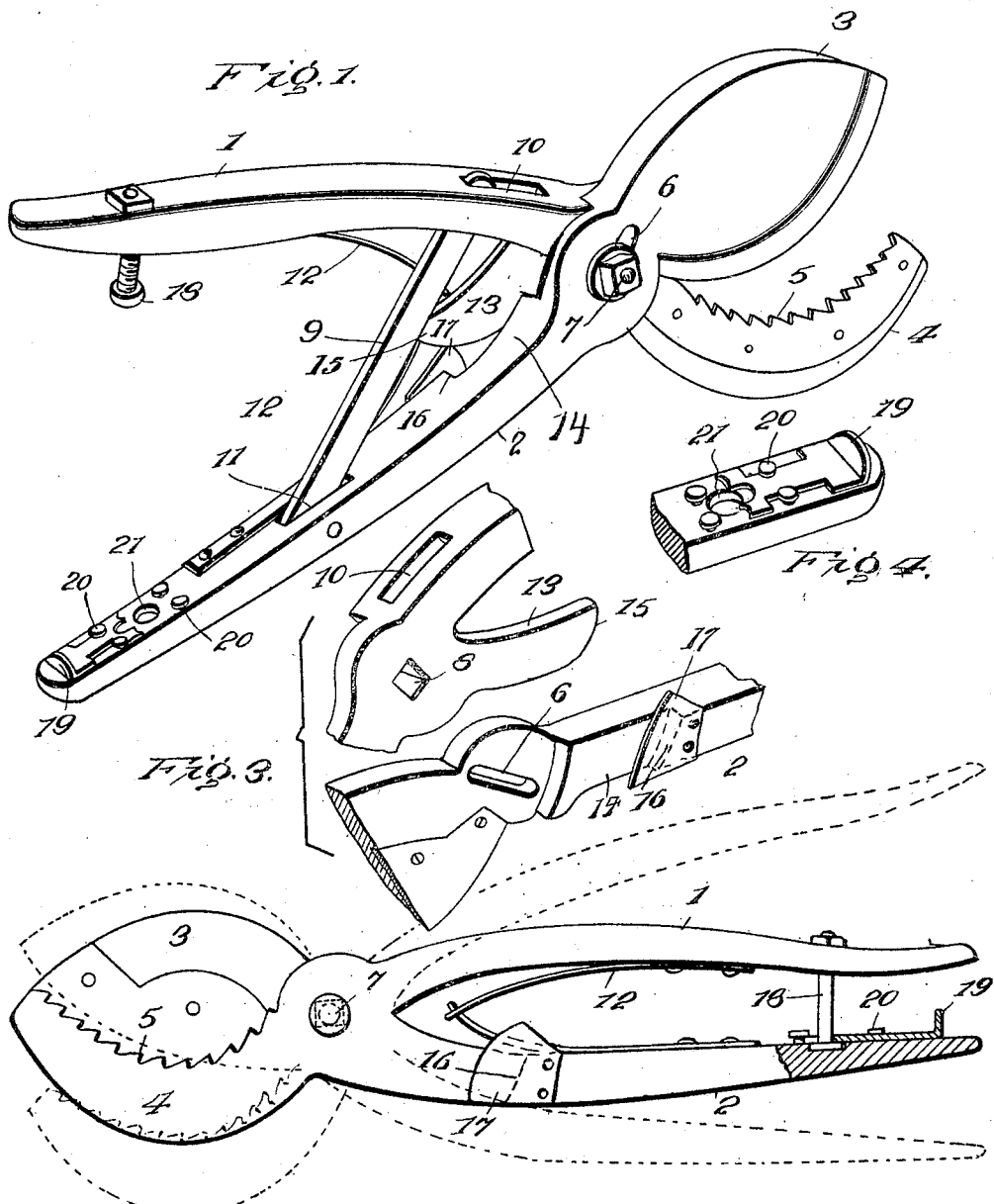

JOHN S. ROHRER, OF LANCASTER, PENNSYLVANIA.

PRUNING IMPLEMENT.

No. 812,528.

Specification of Letters Patent.

Patented Feb. 13, 1906.

Application filed April 29, 1905. Serial No. 258,044.

*To all whom it may concern:*

Be it known that I, JOHN S. ROHRER, a citizen of the United States, residing at Lancaster, in the county of Lancaster and State of Pennsylvania, have invented certain new and useful Improvements in Pruning-Shears, of which the following is a specification.

This invention has relation to the type of implements designed most especially for trimming plants, shrubs, bushes, and the like, the purpose being to provide a tool of this character which will be easy of operation and require the expenditure of a minimum amount of force when applied to comparatively large limbs.

The implement comprises coöperating members connected in a manner to admit of their having both a relative pivotal and sliding movement, so as to facilitate the shearing operation when in use.

The invention relates most especially to the means for pressing the cutter members together and effecting a positive sliding movement thereof, also to the means whereby the members are held closed when the implement is not required for immediate service.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a pair of pruning-shears embodying the invention. Fig. 2 is a side view thereof having an end portion of one of the members in section and showing the operation by full and dotted lines. Fig. 3 is a detail perspective view of the pivoted portions of the members, the same being separated. Fig. 4 is a detail perspective view of the end portion of the member provided with locking-slide. Fig. 5 is a detail broken perspective view of the interlocking springs.

Corresponding and like parts are referred to in the following description and indicated in all the views of the drawings by the same reference characters.

The implement comprises the members 1 and 2, which are crossed near one end and connected in a manner to admit of their having both a pivotal and a relative sliding movement. The member 2 is widened at one end to provide a blade 3, and the corresponding end of the member 1 is formed into a hook 4, having at its inner edge a series of saw-teeth 5, which coöperate with the cutting edge of the blade 3 to effect a shear action when the tool is in operation. The saw-teeth 5 may form a part of the hook 4, but preferably constitute part of a plate, which is secured to the inner side of the hook 4 in any manner.

The member 2 is provided with a slot 6 to receive the rounded portion of the pivot-fastening 7, whereas the member 1 is provided with a square opening 8, in which is snugly fitted the angular portion of the pivot-fastening 7 adjacent to its head. A link 9 is pivotally connected at its ends to the members 1 and 2 and is inclined and so disposed as to insure a relative longitudinal movement of the members simultaneously with their pivotal movement. The end portions of the link 9 are fitted into slots 10, formed in the respective members. The end portion of the link 9 connected with the member 2 is provided with a slot 11, through which the pin or fastening passes, thereby admitting of the link and member having a limited play, which is essential to obviate binding and compensate for irregularities of workmanship in constructing and assembling the parts of the tool. Similar springs 12 are connected at one end to the members, and their opposite ends curve toward each other and interlock, the one being notched, as at 12ª, and the other formed with a tongue 12ᵇ to enter the notch, thereby preventing relative displacement of said springs in the operation of the tool.

An extension or cam projection 13 projects from the member 1 and is adapted to enter a recess 14 of the member 2 and acts jointly with a pivot-fastening 7 to press said members laterally together and coöperates with the link 9 to assist materially in effecting a longitudinal sliding movement of the members when pressed together. In the preferable construction the extension 13 is in the plane of a side of the member 1, thereby clearing the springs 12 and link 9, and the recess 14 is likewise at the same side of the member 2. The extension 13 is provided with a cam portion 15, which is adapted to operate against the shoulder or inner wall 16 of the recess 14, said parts 15 and 16 constituting complemental cams so disposed as to insure a positive sliding movement of the members as they are pressed together. The outer side 17 of the recess 14 may be an integral part of the member 2 or may consist of a plate riveted or otherwise fastened thereto, as shown, most convenient in manufacture, the latter construction being shown.

The cutting ends of the shears are normally forced apart by the springs 12, and in order to hold the shears closed when not required for immediate use the following means have been devised, the same consisting of a headed pin 18, adjustably connected with the member 1, and a locking-slide 19, fitted to the member 2. Headed studs or fastenings 20 are provided upon the inner side of the member 2 and engage over opposite edges of the locking-slide 19 to hold it in place. A recess 21 is provided in the member 5 to receive the head of the pin 18. The locking-slide 19 is slotted at its inner end to admit of the separate portions passing upon opposite sides of the pin and engage with the head thereof, as shown most clearly in Fig. 2, so as to hold the shears closed. The pin 18 is threaded and is screwed into the member 1, thereby admitting of adjusting the members to compensate for wear incident to sharpening the cutters.

A pair of pruning-shears constructed in accordance with this invention operates both by a pivotal and a sliding movement. Hence a comparatively small amount of force is required to be expended for cutting relatively larger limbs. Upon pressing the rear or handle ends of the members 1 and 2 together the cutting members are closed, and at the same time the members receive a relatively longitudinal movement by the combined action of the link 9 and the extension 13 in the manner specified. Upon loosening the grip the springs 12 react to separate the cutting members, thereby admitting of the implement being conveniently and easily operated.

Having thus described the invention, what is claimed as new is—

1. In pruning-shears, the combination of coöperating members, each comprising a suitable handle and blade, a pivotal connection between said members admitting of relatively slidable movement thereof, and a cam projection carried by one of the members and arranged to engage the other member to impart relative sliding movement to the members as the handles are pressed together.

2. In pruning-shears, the combination of coöperating members, each comprising a suitable handle and blade, a pivotal connection between said members admitting of relatively slidable movement thereof, an integral cam projecting from one of the members and engaging the other member to impart relative slidable movement to the members as the handles are pressed together, and an obliquely-disposed link connected at its opposite ends with the said members and coacting with the cam aforesaid to effect relative longitudinal sliding movement of the members as the handles are forced together.

3. Pruning-shears comprising pivotally-connected members normally pressed apart by spring action, each of said members consisting of a handle and blade, means for holding said members closed consisting of a headed pin projecting from the handle of one of the members, and a locking-slide secured to and slidable longitudinally of the handle of the other member and provided with a slot therein to receive the pin aforesaid and engage the head thereof.

In testimony whereof I affix my signature in presence of two witnesses.

JOHN S. ROHRER. [L. S.]

Witnesses:
 J. D. YOAKLEY,
 V. B. HILLYARD.